United States Patent [19]
Beier

[11] Patent Number: 6,101,303
[45] Date of Patent: Aug. 8, 2000

[54] JUNCTION CONFIGURATION FOR A MULTI-CONDUCTOR OPTICAL CABLE

[75] Inventor: Axel Beier, Berlin, Germany

[73] Assignee: Siemens Aktiengesellschaft, Munich, Germany

[21] Appl. No.: 09/162,853

[22] Filed: Sep. 29, 1998

Related U.S. Application Data

[63] Continuation of application No. PCT/DE97/00694, Mar. 27, 1997.

[30] Foreign Application Priority Data

Mar. 29, 1996 [DE] Germany .......................... 196 13 733

[51] Int. Cl.$^7$ ...................................................... G02B 6/44
[52] U.S. Cl. ............................. 385/100; 385/76; 385/114
[58] Field of Search .................................. 385/100, 102, 385/54, 59, 70, 114, 105, 76

[56] References Cited

U.S. PATENT DOCUMENTS

| 4,184,740 | 1/1980 | D'Auria et al. | 350/96.16 |
|---|---|---|---|
| 4,288,107 | 9/1981 | Schwartze | 285/137 R |
| 4,626,067 | 12/1986 | Watson | 350/96.2 |
| 5,222,179 | 6/1993 | Auteri | 385/114 |
| 5,259,050 | 11/1993 | Yamakawa et al. | 385/59 |
| 5,416,874 | 5/1995 | Giebel et al. | 385/100 |
| 5,838,861 | 11/1998 | Bunde | 385/100 |

FOREIGN PATENT DOCUMENTS

| 1-138518 | 5/1989 | Japan | 385/114 |
|---|---|---|---|
| 1-138519 | 5/1989 | Japan | 385/114 |

*Primary Examiner*—Rodney Bovernick
*Assistant Examiner*—Juliana K. Kang
*Attorney, Agent, or Firm*—Herbert L. Lerner; Laurence A. Greenberg; Werner H. Stemer

[57] ABSTRACT

A multi-conductor optical cable is received by a fan out element. A plurality of individual receiving sheaths housing in each case one individual optical waveguide are also received in the fan out element. At least two of the receiving sheaths extend longitudinally parallel and are continuously connected to one another between the fan out element and a separation point.

3 Claims, 1 Drawing Sheet

JUNCTION CONFIGURATION FOR A MULTI-CONDUCTOR OPTICAL CABLE

CROSS-REFERENCE TO RELATED APPLICATION

This is a continuation of copending International Application PCT/DE97/00694, filed Mar. 27, 1997, which designated the United States.

BACKGROUND OF THE INVENTION

FIELD OF THE INVENTION

The invention is within the field of multi-conductor optical cable end preparation. The invention relates to a junction configuration for an optical cable. The junction configuration has a plurality of optical waveguide receiving sheaths and a fan out element into which the optical cable enters and from which the optical waveguide receiving sheaths emerge. The optical waveguide receiving sheaths receiving in each case only one individual optical waveguide of the optical cable.

A junction configuration which includes a shrinkage tube serving as a fan out element is disclosed in Published, Non-Prosecuted German Patent Application DE 43 41 481 A1. Into one of the ends of the shrinkage tube there enters a multi-conductor optical cable which, with release of the ends of its strain relief device, is freed at the end from a cable jacket which is common to the conductors. The conductors branch in pairs into individual jackets or receiving sheaths with in each case one individual strain relief. The receiving sheaths emerge at the other end of the fan out element. In order to guarantee a reliable transfer of the tensile stresses over the junction region, there is introduced into the shrinkage tube a curing or curable sealing material into which the respective strain relief ends are embedded. The pair of optical waveguides of an individual jacket emerges from the free end of the individual jacket and ends in a common plug connector, e.g. a so-called ESCON duplex plug.

The configuration has proved to be effective, in practice, for conductors of a multi-conductor optical cable which extend in pairs power wise in a common receiving sheath and which are received and sealed off by a common dual plug.

In specified practical applications, with regard to flexibility and an increased assembly and service friendliness, use is increasingly being made of dual plug constructions in which two individual plugs (e.g. SC plugs) form a dual plug (so-called SC duplex plug) with the aid of a common holder. Such a dual plug is known, for example, from German Patent DE 43 02 826 C1 corresponding to U.S. Pat. No. 5,574,812. In the use of such a dual plug for the (partial) connection of a multi-conductor cable, the individual receiving sheaths separately emerging from the fan out element could in principle in each instance guide an individual optical waveguide to the respective individual plug. As the free length of the individual receiving sheaths increases, there is however the risk that the relatively flexurally slack sheaths will become twisted and/or tangled with adjacent receiving sheaths or articles, and it being possible for the optical waveguide extending within them to be damaged.

U.S. Pat. No. 4,626,067 discloses a junction configuration of the initially mentioned type, which includes a fan out element into one of the ends of which a multi-conductor optical cable enters. The fan out element is a cylindrical sleeve, which may be provided, at its other end, with individual receiving bushings. Individual optical waveguide receiving sheaths that receive in each case one optical waveguide end in the receiving bushings. The optical waveguides emerging from the receiving bushings extend freely and individually to an individual plug which is disposed in each instance at the end of the optical waveguide.

SUMMARY OF THE INVENTION

It is accordingly an object of the invention to provide a junction configuration for a multi-conductor optical cable which overcomes the above-mentioned disadvantages of the prior art devices of this general type, which makes it possible for individual optical waveguides, provided with individual plugs at their ends, to extend individually to approximately the same location, without being exposed to an increased risk of damage.

With the foregoing and other objects in view there is provided, in accordance with the invention, a junction configuration for optical cabling, including: an optical cable having a plurality of optical waveguides with free ends; a plurality of waveguide receiving sheaths each housing only one of said plurality of optical waveguides; a fan out element receiving the optical cable and the plurality of waveguide receiving sheaths, the plurality of waveguide receiving sheaths emerging and extending from the fan out element; and at least two of the plurality of waveguide receiving sheaths connected to one another up to a separation point positioned beyond the fan out element in a direction to the free ends of the optical waveguides and the at least two of the plurality of waveguide receiving sheaths extending to the separation point longitudinally parallel and in a flexible fashion.

In the case of a junction configuration of the initially mentioned type, the object is achieved according to the invention in that at least two of the receiving sheaths are connected to one another as far as a separation point located beyond the fan out element or junction body, in such a way that, as far as the separation point, they extend longitudinally parallel and in a flexible fashion.

In accordance with an added feature of the invention, the at least two of the plurality of waveguide receiving sheaths connected to one another have an end region and are separable by radial tension forces acting at the end region for shifting the separating point toward the fan out element.

In accordance with a concomitant feature of the invention, there is a shrink fit hose securing the at least two of the plurality of waveguide receiving sheaths connected to one another at the separation point.

Other features which are considered as characteristic for the invention are set forth in the appended claims.

Although the invention is illustrated and described herein as embodied in a junction configuration for a multi-conductor optical cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 2:
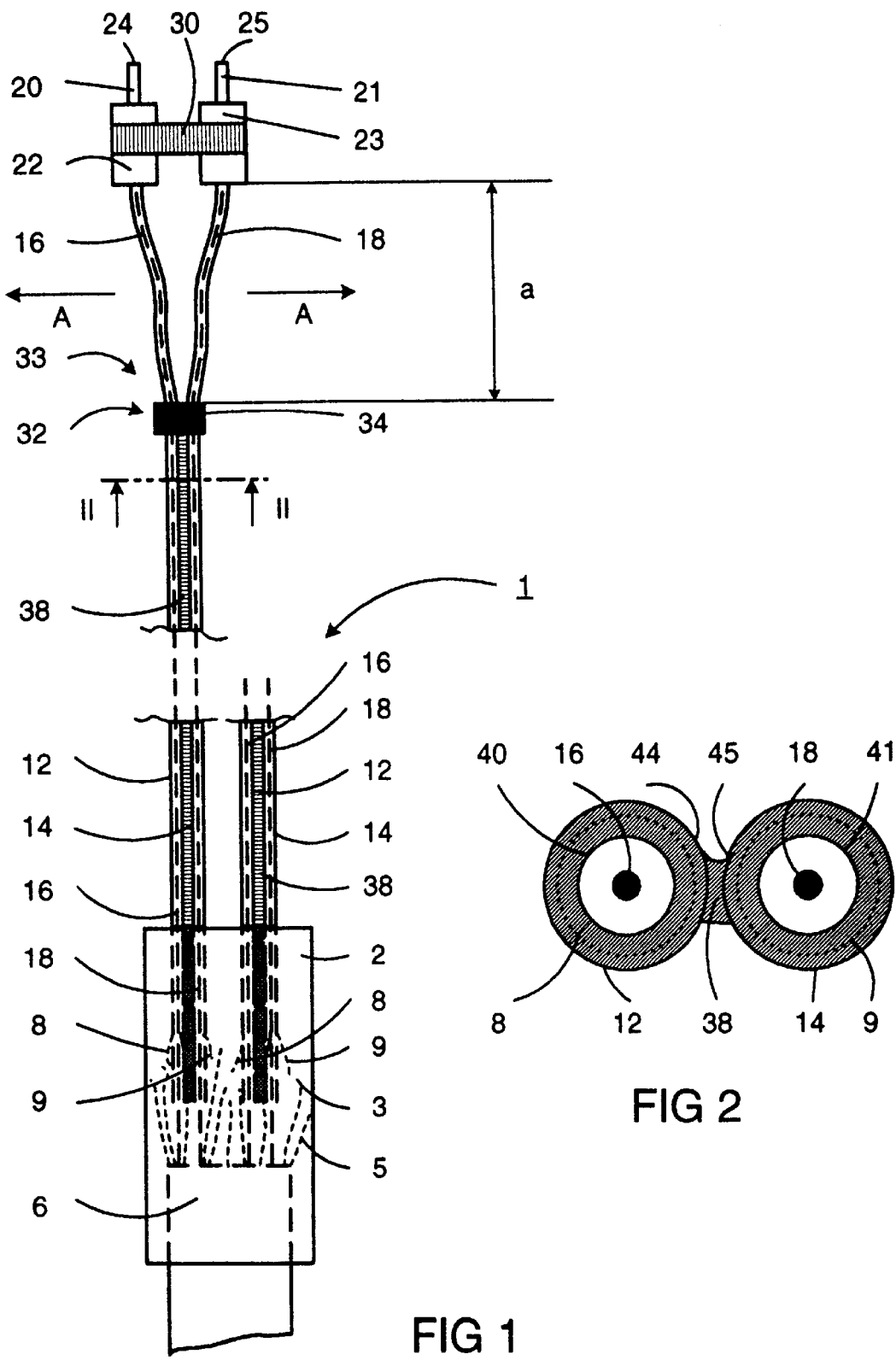
FIG. 1 is a top plan view of a junction configuration according to the invention.
FIG. 2 is an enlarged, cross-sectional view along the line II—II of FIG. 1.

Referring now to the figures of the drawing in detail and first, particularly, to FIG. 1 thereof, there is shown a junction configuration 1 including a fan out element (junction body) 2, which, for example in the manner known per se from Published, Non-Prosecuted German Patent Application 43 41 481 A1, may consist of a shrinkage tube filled with a sealing material 3. Into the sealing material 3 there are embedded the free ends of a strain relief 5 of a multi-conductor optical cable 6 as well as the ends of strain reliefs 8, 9 of in each case two receiving sheaths 12, 14 which are connected in pairs (also designated as "fan out tubing"). For the sake of a clearer representation, FIG. 1 shows only two pairs of outgoing receiving sheaths 12, 14 that emerge from the fan out element 2. In principle, it is of course possible for a substantially larger number of individual receiving sheaths to emerge from the fan out element 2. An optical waveguide 16, 18 is in each case individually guided in the receiving sheaths 12, 14. It is further noted that it is not necessary that the waveguide receiving sheaths 12, 14 are within the optical cable 6. The end of each optical waveguide 16, 18 is, in a manner known per se, centrally received by a plug pin 20, 21 of a so-called SC plug 22, 23 and its end surface terminates in the end surface 24, 25 of its plug pin 20, 21. This permits an optical coupling of the optical waveguides 16, 18 with coupling partners which are not shown. The two SC plugs 22, 23 are received by a common holder 30 and thus form a so-called SC duplex plug.

A relatively short portion "a" of, for example, 30 cm exists between the SC plugs 22, 23 and a separation location 32 in an end region 33 of the receiving sheaths 12, 14 which separation location is surrounded by a shrunk-on shrinkage tube 34. Between the separation location 32 and the fan out element 2, the receiving sheaths 12, 14 extend longitudinally parallel and are connected at their jacket sides facing one another. To this end, the jacket material may be directly connected, e.g. by fusion. The sheath jackets can advantageously be generated in a form already connected, for example in that they are produced from a suitable plastic material by extrusion and have a construction which in cross section corresponds to a reclining eight. A connection 38 between the receiving sheaths 12, 14 is, in this case, constructed in such a way that in the event of the occurrence of radial tensile forces, as indicated by arrows A, a separation of the sheaths 12, 14 is made possible. This simplifies in particular to a considerable extent the in situ assembly. In this case, a more extensive separation beyond the separation point 32 in the direction of the fan out element 2 is prevented by the shrinkage tube 34.

FIG. 2 shows, in a detailed and enlarged representation, a cross-sectional view along the line II—II in FIG. 1 of the optical waveguide conductors 16, 18 extending in the interior of in each case one tube 40, 41 having a diameter of approximately 1.2 mm. The tubes 40, 41 consist of a flexible material (e.g. PTFE), which, in the course of the assembly of the configuration, permits a simple threading-in of the optical waveguides 16, 18, even over a length of a plurality of meters. Furthermore, the fiber-type strain relief (e.g. aramid fibers) 8, 9 can be seen. The connection 38 can be seen between the mutually facing jacket surfaces 44, 45 of the sheaths 12, 14.

I claim:

1. In a junction configuration for an optical cable having a plurality of optical waveguides with free ends, the improvement comprising:

a plurality of waveguide receiving sheaths having outer jacket surfaces and each housing only one of the plurality of optical waveguides;

a fan out element receiving the optical cable and said plurality of waveguide receiving sheaths, said plurality of waveguide receiving sheaths emerging and extending from said fan out element, said fan out element being fixedly connected to the optical cable; and at least two of said plurality of waveguide receiving sheaths being connected to one another at mutually facing sides of said outer jacket surfaces up to a separation point positioned beyond said fan out element in a direction of the free ends of the optical waveguides, and said at least two of said plurality of waveguide receiving sheaths extending to said separation point longitudinally parallel and in a flexible fashion.

2. The junction configuration according to claim 1, wherein said at least two of said plurality of waveguide receiving sheaths connected to one another have an end region and are separable by radial tension forces acting at said end region for shifting said separating point toward said fan out element.

3. The junction configuration according to claim 1, including a shrink fit hose securing said at least two of said plurality of waveguide receiving sheaths connected to one another at said separation point.

\* \* \* \* \*